United States Patent
Lee et al.

(10) Patent No.: US 10,567,150 B2
(45) Date of Patent: *Feb. 18, 2020

(54) METHOD FOR CHANGING RS MODE IN ENVIRONMENT WHERE OPERATION IS DONE BY FDR SCHEME, AND DEVICE THEREFOR

(71) Applicant: LG ELECTRONICS INC., Seoul (KR)

(72) Inventors: Sangrim Lee, Seoul (KR); Dongkyu Kim, Seoul (KR); Hyunsoo Ko, Seoul (KR); Kwangseok Noh, Seoul (KR); Hojae Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 14 days.

This patent is subject to a terminal disclaimer.

(21) Appl. No.: 15/755,045

(22) PCT Filed: Jan. 27, 2016

(86) PCT No.: PCT/KR2016/000860
§ 371 (c)(1),
(2) Date: Feb. 23, 2018

(87) PCT Pub. No.: WO2017/034106
PCT Pub. Date: Mar. 2, 2017

(65) Prior Publication Data
US 2018/0248677 A1    Aug. 30, 2018

Related U.S. Application Data

(60) Provisional application No. 62/210,405, filed on Aug. 26, 2015.

(51) Int. Cl.
*H04L 5/14* (2006.01)
*H04L 5/00* (2006.01)

(52) U.S. Cl.
CPC .......... *H04L 5/1461* (2013.01); *H04L 5/0048* (2013.01)

(58) Field of Classification Search
None
See application file for complete search history.

(56) References Cited

U.S. PATENT DOCUMENTS

2011/0235728 A1 * 9/2011 Karabinis ................. H03F 3/24
375/260
2014/0348018 A1   11/2014 Bharadia et al.
(Continued)

FOREIGN PATENT DOCUMENTS

EP    3016305    5/2016
EP    3324589    5/2018
(Continued)

OTHER PUBLICATIONS

PCT International Application No. PCT/KR2016/000860, Written Opinion of the International Searching Authority dated May 26, 2016, 18 pages.

(Continued)

*Primary Examiner* — Eunsook Choi
(74) *Attorney, Agent, or Firm* — Lee, Hong, Degerman, Kang & Waimey

(57) ABSTRACT

A method for a device changing a RS mode, the device operating by a FDR scheme, comprises the steps of: deciding to change from a first RS mode to a second RS mode if a preset condition is satisfied; and transmitting information related to the decided second RS mode to a terminal, wherein the first RS mode and the second RS mode may be distinguished from each other by whether RSs which are added in order to channel estimate a non-linear component of a self-interference signal are transmitted or not.

20 Claims, 7 Drawing Sheets

(56) References Cited

U.S. PATENT DOCUMENTS

| | | | |
|---|---|---|---|
| 2017/0005773 A1* | 1/2017 | Liu | H04B 1/525 |
| 2017/0063518 A1* | 3/2017 | Chen | H04L 5/1461 |
| 2017/0085398 A1* | 3/2017 | Liu | H04L 5/0048 |
| 2018/0048347 A1 | 2/2018 | Kim et al. | |
| 2018/0083744 A1 | 3/2018 | Kim et al. | |
| 2018/0160432 A1* | 6/2018 | Kim | H04L 25/02 |

FOREIGN PATENT DOCUMENTS

| | | |
|---|---|---|
| WO | 2014200212 | 12/2014 |
| WO | 2014200262 | 12/2014 |
| WO | 2014208953 | 12/2014 |

OTHER PUBLICATIONS

Syrjala, V. et al., "Analysis of Oscillator Phase-Noise Effects on Self-Interference Cancellation in Full-Duplex OFDM Radio Transceivers", Revised manuscript for IEEE Transactions on Wireless Communications, Apr. 2014, 15 pages.

European Patent Office Application Serial No. 16839397.3, Search Report dated Feb. 22, 2019, 11 pages.

* cited by examiner

METHOD FOR CHANGING RS MODE IN ENVIRONMENT WHERE OPERATION IS DONE BY FDR SCHEME, AND DEVICE THEREFOR

CROSS-REFERENCE TO RELATED APPLICATIONS

This application is the National Stage filing under 35 U.S.C. 371 of International Application No. PCT/KR2016/000860, filed on Jan. 27, 2016, which claims the benefit of U.S. Provisional Application No. 62/210,405, filed on Aug. 26, 2015, the contents of which are all hereby incorporated by reference herein in their entirety.

TECHNICAL FIELD

The present invention relates to wireless communication, and more particularly, to a method for changing a reference signal (RS) mode in an environment operating according to a full duplex radio (FDR) scheme and apparatus therefor.

BACKGROUND ART

Compared to conventional half duplex communication in which time or frequency resources are divided orthogonally, full duplex communication doubles a system capacity in theory by allowing a node to perform transmission and reception simultaneously.

FIG. 1 is a conceptual view of a UE and a Base Station (BS) which support Full Duplex Radio (FDR).

In the FDR situation illustrated in FIG. 1, the following three types of interference are produced.

Intra-Device Self-Interference:

Because transmission and reception take place in the same time and frequency resources, a desired signal and a signal transmitted from a BS or UE are received at the same time at the BS or UE. The transmitted signal is received with almost no attenuation at a Reception (Rx) antenna of the BS or UE, and thus with much larger power than the desired signal. As a result, the transmitted signal serves as interference.

UE to UE Inter-Link Interference:

An Uplink (UL) signal transmitted by a UE is received at an adjacent UE and thus serves as interference.

BS to BS Inter-Link Interference:

The BS to BS inter-link interference refers to interference caused by signals that are transmitted between BSs or heterogeneous BSs (pico, femto, and relay) in a HetNet state and received by an Rx antenna of another BS.

Among such three types of interference, intra-device self-interference (hereinafter, self-interference (SI)) is generated only in an FDR system to significantly deteriorate performance of the FDR system. Therefore, first of all, intra-device SI needs to be cancelled in order to operate the FDR system.

DISCLOSURE OF THE INVENTION

Technical Task

The first object of the present invention is to provide a method for changing an RS mode in an environment operating according to a FDR scheme.

The second object of the present invention is to provide an apparatus for changing an RS mode in an environment operating according to a FDR scheme.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

To achieve the first object of the present invention, provided herein is a method for changing a reference signal (RS) mode by an apparatus operating according to a full duplex radio (FDR) scheme, including: when a predetermined condition is satisfied, determining to change from a first RS mode to a second RS mode; and transmitting information on the determined second RS mode to a user equipment (UE). In this case, the first and second RS modes may be distinguished from each other according to whether RSs added to perform channel estimation for a nonlinear component of a self-interference (SI) signal are transmitted or not.

The predetermined condition is satisfied when a difference between power of a linear component of the SI signal and power of the nonlinear component of the SI signal is smaller than a predefined value. In this case, the second RS mode may be a mode in which the RSs added to perform the channel estimation for the nonlinear component of the SI signal are transmitted. In addition, the information on the determined second RS mode may include resource information for the added RSs. Moreover, the information on the determined second RS mode may include an indicator indicating that resources for the added RSs are assigned.

The predetermined condition is satisfied when a difference between power of a linear component of the SI signal and power of the nonlinear component of the SI signal is greater than a predefined value. In this case, the second RS mode may be a mode in which the RSs added to perform the channel estimation for the nonlinear components of the SI signal are not transmitted. In addition, the information on the determined second RS mode may include resource information for RSs for which resource assignment is released. Moreover, the information on the determined second RS mode may include an indicator indicating that resource assignment for the added RSs is released.

The method may further include calculating a difference between power of a linear component of the SI signal and power of the nonlinear component of the SI signal and comparing the difference with a predefined value. In addition, the method may further include transmitting an RS according to the determined second RS mode.

To achieve the second object of the present invention, provided herein is an apparatus for changing a reference signal (RS) mode in a full duplex radio (FDR) environment, including: a processor configured to determine to switch from a first RS mode to a second RS mode when a predetermined condition is satisfied; and a transmitter configured to transmit information on the determined second RS mode to a user equipment (UE). In this case, the first and second RS modes may be distinguished from each other according to whether RSs added to perform channel estimation for a nonlinear component of a self-interference (SI) signal are transmitted or not.

When a difference between power of a linear component of the SI signal and power of the nonlinear component of the SI signal is smaller than a predefined value. In this case, the second RS mode may be a mode in which the RSs added to perform the channel estimation for the nonlinear component of the SI signal are transmitted. In addition, the information on the determined second RS mode may include resource information for the added RSs. Moreover, the information on the determined second RS mode may include an indicator indicating that resources for the added RSs are assigned.

When a difference between power of a linear component of the SI signal and power of the nonlinear component of the SI signal is greater than a predefined value. In this case, the second RS mode may be a mode in which the RSs added to perform the channel estimation for the nonlinear component of the SI signal are not transmitted. In addition, the information on the determined second RS mode may include resource information for RSs for which resource assignment is released. Moreover, the information on the determined second RS mode may include an indicator indicating that resource assignment for the added RSs is released.

Advantageous Effects

According to the present invention, downlink and uplink resources can be efficiently used by changing an RS mode in an FDR environment and signaling the change of the RS mode.

It will be appreciated by persons skilled in the art that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

BEST MODE FOR INVENTION

Figure 1:
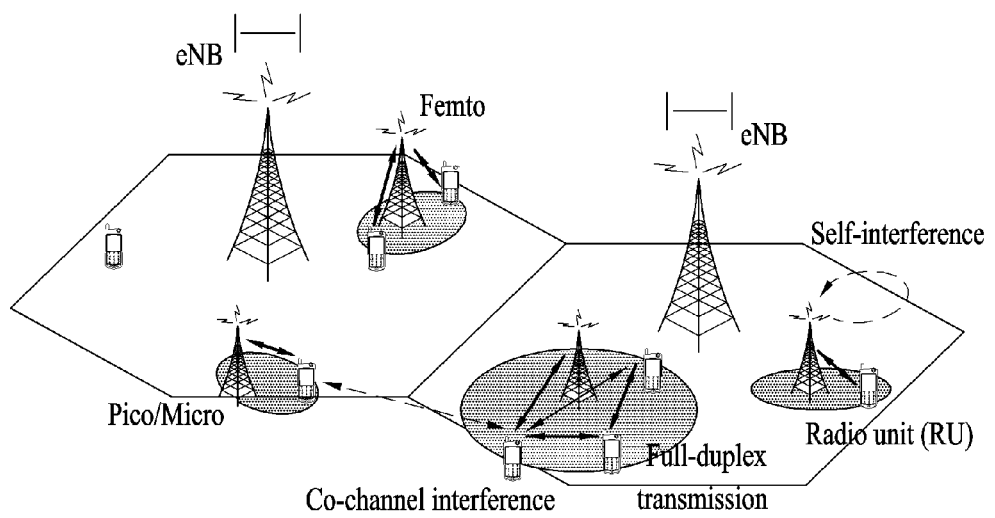
FIG. 1 is a diagram illustrating an exemplary network supporting full-duplex/half-duplex communication operation schemes for a UE proposed in the present invention.

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details. For instance, although the following descriptions are made in detail on the assumption that a mobile communication system includes 3GPP LTE system, the following descriptions are applicable to other random mobile communication systems in a manner of excluding unique features of the 3GPP LTE.

Occasionally, to prevent the present invention from getting vaguer, structures and/or devices known to the public are skipped or can be represented as block diagrams centering on the core functions of the structures and/or devices. Wherever possible, the same reference numbers will be used throughout the drawings to refer to the same or like parts.

Besides, in the following description, assume that a terminal is a common name of such a mobile or fixed user stage device as a user equipment (UE), a mobile station (MS), an advanced mobile station (AMS) and the like. And, assume that a base station (BS) is a common name of such a random node of a network stage communicating with a terminal as a Node B (NB), an eNode B (eNB), an access point (AP) and the like. Although the present specification is described based on IEEE 802.16m system, contents of the present invention may be applicable to various kinds of other communication systems.

In a mobile communication system, a user equipment is able to receive information in downlink and is able to transmit information in uplink as well. Information transmitted or received by the user equipment node may include various kinds of data and control information. In accordance with types and usages of the information transmitted or received by the user equipment, various physical channels may exist.

The following descriptions are usable for various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented by such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. The 3GPP LTE employs OFDMA in DL and SC-FDMA in UL. And, LTE-A (LTE-Advanced) is an evolved version of 3GPP LTE.

Moreover, in the following description, specific terminologies are provided to help the understanding of the present invention. And, the use of the specific terminology can be modified into another form within the scope of the technical idea of the present invention.

Figure 2:
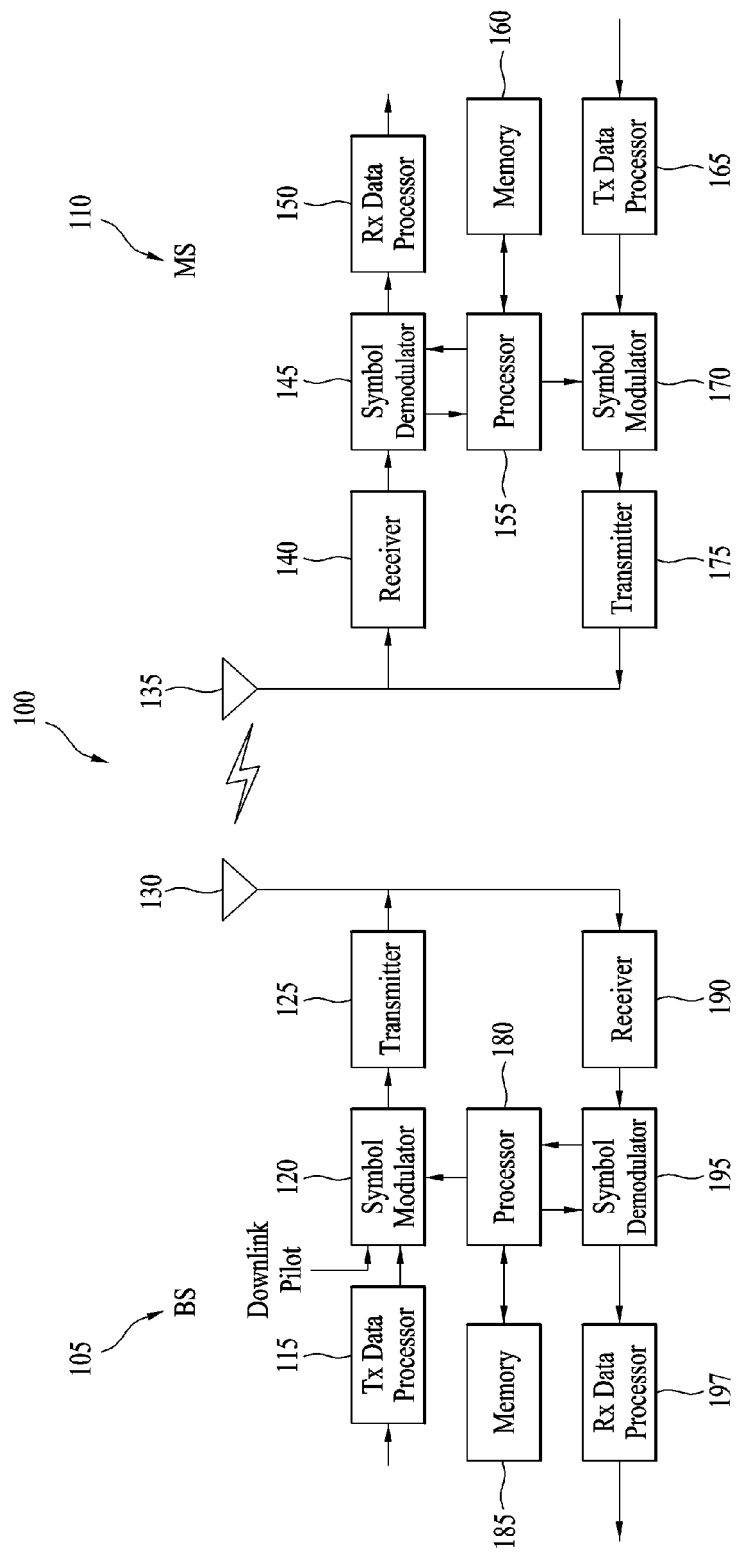
FIG. 2 is a block diagram for configurations of a base station (BS) 105 and a user equipment (UE) 110 in a wireless communication system 100.

FIG. 2 is a block diagram for configurations of a base station 105 and a user equipment 110 in a wireless communication system 100.

Although one base station 105 and one user equipment 110 (D2D user equipment included) are shown in the drawing to schematically represent a wireless communication system 100, the wireless communication system 100 may include at least one base station and/or at least one user equipment.

Referring to FIG. 2, a base station 105 may include a transmitted (Tx) data processor 115, a symbol modulator 120, a transmitter 125, a transceiving antenna 130, a processor 180, a memory 185, a receiver 190, a symbol demodulator 195 and a received data processor 197. And, a user equipment 110 may include a transmitted (Tx) data processor 165, a symbol modulator 170, a transmitter 175, a transceiving antenna 135, a processor 155, a memory 160, a receiver 140, a symbol demodulator 155 and a received data processor 150. Although the base station/user equipment 105/110 includes one antenna 130/135 in the drawing, each of the base station 105 and the user equipment 110 includes a plurality of antennas. Therefore, each of the base station 105 and the user equipment 110 of the present invention supports an MIMO (multiple input multiple output) system. And, the base station 105 according to the present invention may support both SU-MIMO (single user-MIMO) and MU-MIMO (multi user-MIMO) systems.

In downlink, the transmitted data processor 115 receives traffic data, codes the received traffic data by formatting the received traffic data, interleaves the coded traffic data, modulates (or symbol maps) the interleaved data, and then provides modulated symbols (data symbols). The symbol modulator 120 provides a stream of symbols by receiving and processing the data symbols and pilot symbols.

The symbol modulator 120 multiplexes the data and pilot symbols together and then transmits the multiplexed symbols to the transmitter 125. In doing so, each of the transmitted symbols may include the data symbol, the pilot symbol or a signal value of zero. In each symbol duration, pilot symbols may be contiguously transmitted. In doing so, the pilot symbols may include symbols of frequency division multiplexing (FDM), orthogonal frequency division multiplexing (OFDM), or code division multiplexing (CDM).

The transmitter 125 receives the stream of the symbols, converts the received stream to at least one or more analog signals, additionally adjusts the analog signals (e.g., amplification, filtering, frequency upconverting), and then generates a downlink signal suitable for a transmission on a radio channel subsequently, the downlink signal is transmitted to the user equipment via the antenna 130.

In the configuration of the user equipment 110, the receiving antenna 135 receives the downlink signal from the base station and then provides the received signal to the receiver 140. The receiver 140 adjusts the received signal (e.g., filtering, amplification and frequency downconverting), digitizes the adjusted signal, and then obtains samples. The symbol demodulator 145 demodulates the received pilot symbols and then provides them to the processor 155 for channel estimation.

The symbol demodulator 145 receives a frequency response estimated value for downlink from the processor 155, performs data demodulation on the received data symbols, obtains data symbol estimated values (i.e., estimated values of the transmitted data symbols), and then provides the data symbols estimated values to the received (Rx) data processor 150. The received data processor 150 reconstructs the transmitted traffic data by performing demodulation (i.e., symbol demapping, deinterleaving and decoding) on the data symbol estimated values.

The processing by the symbol demodulator 145 and the processing by the received data processor 150 are complementary to the processing by the symbol modulator 120 and the processing by the transmitted data processor 115 in the base station 105, respectively.

In the user equipment 110 in uplink, the transmitted data processor 165 processes the traffic data and then provides data symbols. The symbol modulator 170 receives the data symbols, multiplexes the received data symbols, performs modulation on the multiplexed symbols, and then provides a stream of the symbols to the transmitter 175. The transmitter 175 receives the stream of the symbols, processes the received stream, and generates an uplink signal. This uplink signal is then transmitted to the base station 105 via the antenna 135.

In the base station 105, the uplink signal is received from the user equipment 110 via the antenna 130. The receiver 190 processes the received uplink signal and then obtains samples. Subsequently, the symbol demodulator 195 processes the samples and then provides pilot symbols received in uplink and a data symbol estimated value. The received data processor 197 processes the data symbol estimated value and then reconstructs the traffic data transmitted from the user equipment 110.

The processor 155/180 of the user equipment/base station 110/105 directs operations (e.g., control, adjustment, management, etc.) of the user equipment/base station 110/105. The processor 155/180 may be connected to the memory unit 160/185 configured to store program codes and data. The memory 160/185 is connected to the processor 155/180 to store operating systems, applications and general files.

The processor 155/180 may be called one of a controller, a microcontroller, a microprocessor, a microcomputer and the like. And, the processor 155/180 may be implemented using hardware, firmware, software and/or any combinations thereof. In the implementation by hardware, the processor 155/180 may be provided with such a device configured to implement the present invention as ASICs (application specific integrated circuits), DSPs (digital signal processors), DSPDs (digital signal processing devices), PLDs (programmable logic devices), FPGAs (field programmable gate arrays), and the like.

Meanwhile, in case of implementing the embodiments of the present invention using firmware or software, the firmware or software may be configured to include modules, procedures, and/or functions for performing the above-explained functions or operations of the present invention. And, the firmware or software configured to implement the present invention is loaded in the processor 155/180 or saved in the memory 160/185 to be driven by the processor 155/180.

Layers of a radio protocol between a user equipment/base station and a wireless communication system (network) may be classified into 1st layer L1, 2nd layer L2 and 3rd layer L3 based on 3 lower layers of OSI (open system interconnection) model well known to communication systems. A physical layer belongs to the 1st layer and provides an information transfer service via a physical channel. RRC (radio resource control) layer belongs to the 3rd layer and provides control radio resourced between UE and network. A user equipment and a base station may be able to exchange RRC messages with each other through a wireless communication network and RRC layers.

In the present specification, although the processor 155/180 of the user equipment/base station performs an operation of processing signals and data except a function for the user equipment/base station 110/105 to receive or transmit a signal, for clarity, the processors 155 and 180 will not be mentioned in the following description specifically. In the following description, the processor 155/180 can be regarded as performing a series of operations such as a data processing and the like except a function of receiving or transmitting a signal without being specially mentioned.

Figure 3:
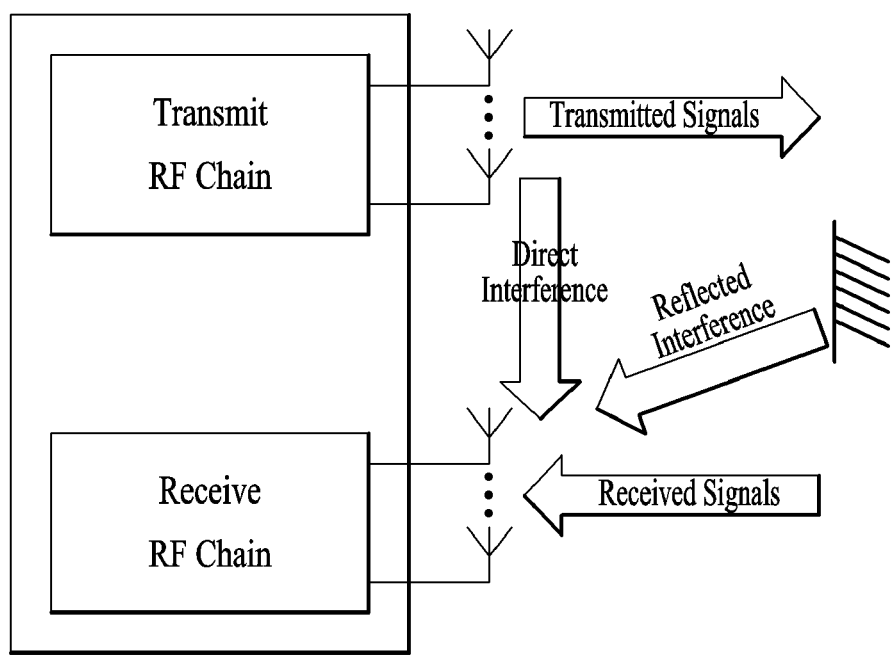
FIG. 3 is a conceptual diagram illustrating transmission/reception links and self-interference (SI) in an FDR communication environment.

FIG. 3 is a diagram showing the concept of a transmission/reception link and self-interference (SI) in an FDR communication situation.

As shown in FIG. 3, SI may be divided into direct interference caused when a signal transmitted from a transmit antenna directly enters a receive antenna without path attenuation, and reflected interference reflected by peripheral topology, and the level thereof is dramatically greater than a desired signal due to a physical distance difference. Due to the dramatically large interference intensity, efficient SI cancellation is necessary to operate the FDR system.

To effectively operate the FDR system, self-IC requirements with respect to the maximum transmission power of devices (in the case where FDR is applied to a mobile communication system (BW=20 MHz)) may be determined as illustrated in [Table 1] below.

TABLE 1

| Node Type | Max. Tx Power ($P_A$) | Thermal Noise. (BW = 20 MHz) | Receiver NF | Receiver Thermal Noise Level | Self-IC Target ($P_A$-TN-NF) |
|---|---|---|---|---|---|
| Macro eNB | 46 dBm | −101 dBm | 5 dB (for eNB) | −96 dBm | 142 dB |
| Pico eNB | 30 dBm | | | | 126 dB |
| Femto eNB, WLAN AP | 23 dBm | | | | 119 dB |
| UE | 23 dBm | | 9 dB (for UE) | −92 dBm | 115 dB |

Referring to [Table 1], it may be noted that to effectively operate the FDR system in a 20-MHz BW, a UE needs 119-dBm Self-IC performance. A thermal noise value may be changed to $N_{0,BW}$=−174 dBm 10×$\log_{10}$(BW) according to the BW of a mobile communication system. In [Table 1], the thermal noise value is calculated on the assumption of a 20-MHz BW. In relation to [Table 1], for Receiver Noise Figure (NF), a worst case is considered referring to the 3GPP specification requirements. Receiver Thermal Noise Level is determined to be the sum of a thermal noise value and a receiver NF in a specific BW.

Types of Self-IC Schemes and Methods for Applying the Self-IC Schemes

Figure 4:
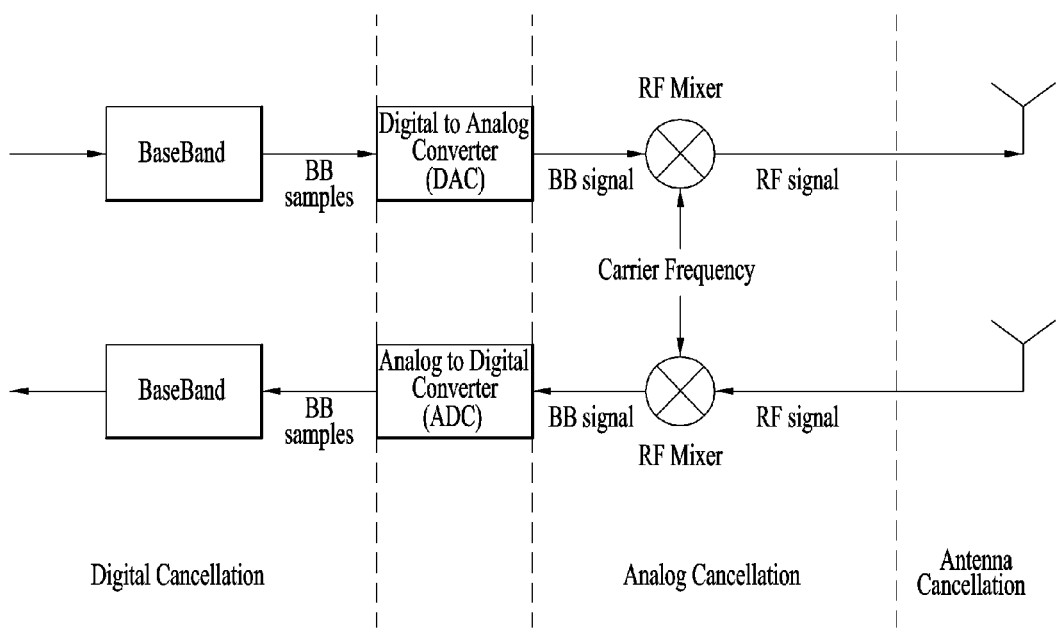
FIG. 4 is a diagram illustrating positions where three interference cancellation schemes are applied in an RF transmission and reception end (or RF front end) of an apparatus.

FIG. 4 is a view illustrating positions at which three Self-IC schemes are applied, in a Radio Frequency (RF) Tx and Rx end (or an RF front end) of a device. Now, a brief description will be given of the three Self-IC schemes.

Antenna Self-IC:

Antenna Self-IC is a Self-IC scheme that should be performed first of all Self-IC schemes. SI is cancelled at an antenna end. Most simply, transfer of an SI signal may be blocked physically by placing a signal-blocking object between a Tx antenna and an Rx antenna, the distance between antennas may be controlled artificially, using multiple antennas, or a part of an SI signal may be canceled through phase inversion of a specific Tx signal. Further, a part of an SI signal may be cancelled by means of multiple polarized antennas or directional antennas.

Analog Self-IC:

Interference is canceled at an analog end before an Rx signal passes through an Analog-to-Digital Convertor (ADC). An SI signal is canceled using a duplicated analog signal. This operation may be performed in an RF region or an Intermediate Frequency (IF) region. SI signal cancellation may be performed in the following specific method. A duplicate of an actually received SI signal is generated by delaying an analog Tx signal and controlling the amplitude and phase of the delayed Tx signal, and subtracted from a signal received at an Rx antenna. However, due to the analog signal-based processing, the resulting implementation complexity and circuit characteristics may cause additional distortion, thereby changing interference cancellation performance significantly.

Digital Self-IC:

Interference is canceled after an Rx signal passes through an ADC. Digital Self-IC covers all IC techniques performed in a baseband region. Most simply, a duplicate of an SI signal is generated using a digital Tx signal and subtracted from an Rx digital signal. Or techniques of performing precoding/postcoding in a baseband using multiple antennas so that a Tx signal of a UE or an eNB may not be received at an Rx antenna may be classified into digital Self-IC. However, since digital Self-IC is viable only when a digital modulated signal is quantized to a level enough to recover information of a desired signal, there is a need for the prerequisite that the difference between the signal powers of a designed signal and an interference signal remaining after interference cancellation in one of the above-described techniques should fall into an ADC range, to perform digital Self-IC.

Figure 5:
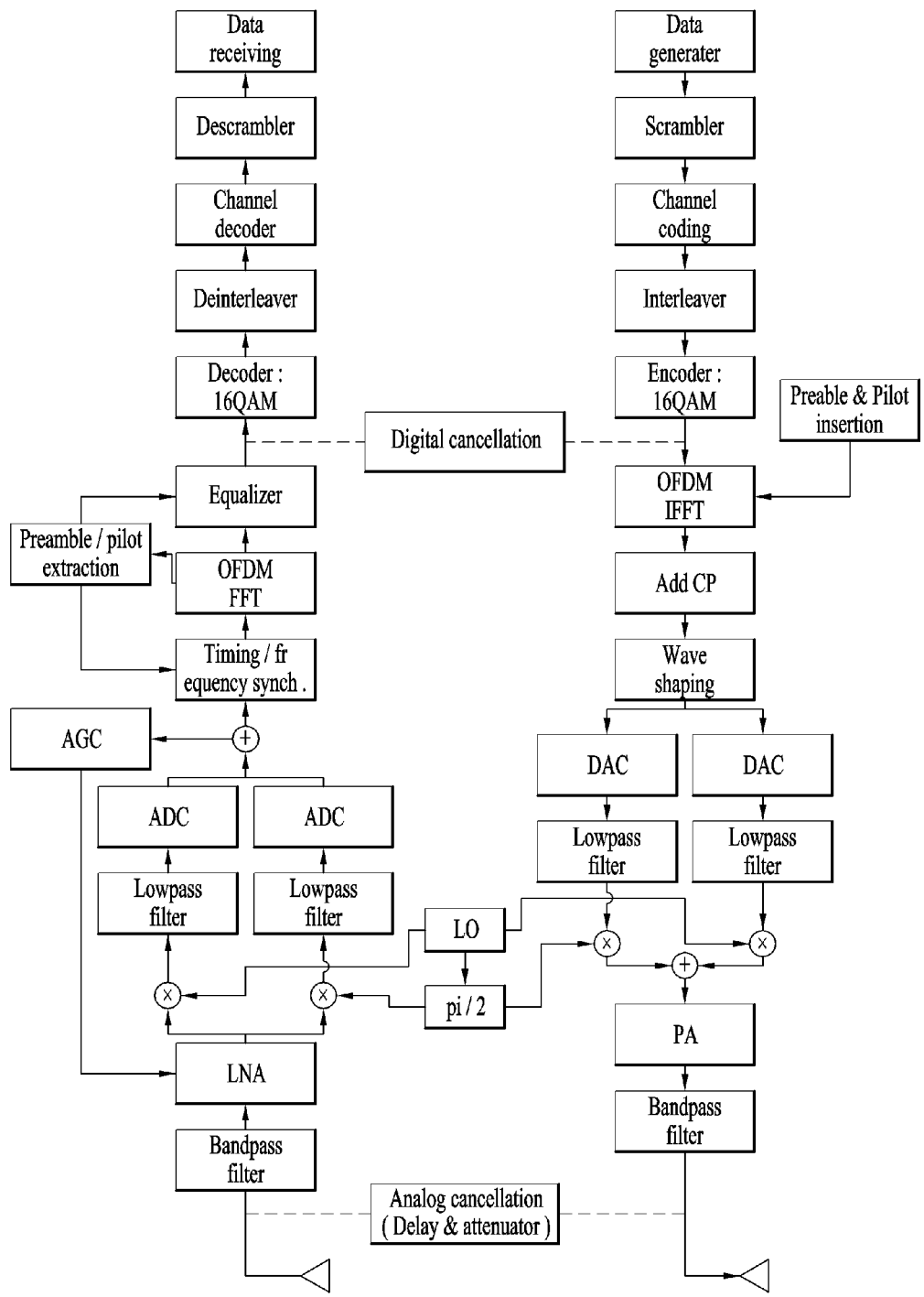
FIG. 5 is a block diagram of a self-interference (Self-IC) device installed in a proposed communication apparatus operating in the OFDM communication system with reference to FIG. 4.

FIG. 5 is a block diagram of a Self-IC device in a proposed communication apparatus in an OFDM communication environment based on FIG. 4.

While FIG. 5 shows that digital Self-IC is performed using digital SI information before Digital to Analog Conversion (DAC) and after ADC, it may be performed using a digital SI signal after Inverse Fast Fourier Transform (IFFT) and before Fast Fourier Transform (FFT). Further, although FIG. 5 is a conceptual view of Self-IC though separation of a Tx antenna from an Rx antenna, if antenna Self-IC is performed using a single antenna, the antenna may be configured in a different manner from in FIG. 5. A functional block may be added to or removed from an RF Tx end and an RF Rx end shown in FIG. 5 according to a purpose.

Signal Modeling of FDR System

The signal received by a device (e.g., UE, BS, etc.) in the FDR system can modeled as shown in Equation 1.

$$y(n) = h_D(n) * x_D(n) + \sum_{\substack{k=1,\ldots,K \\ k=odd}} h_{SI,k}(n) * |x_{SI}(n)|^{k-1} x_{SI}(n) + z(n), \quad \text{[Equation 1]}$$

In Equation 1, $x_D[n]$ indicates data which an RF receiving end of the device desires to receive, $h_D[n]$ indicates a gain of a desired channel through which the data that the RF receiving end desires to receive passes, $x_{SI}[n]$ indicates data transmitted at an RF transmitting end of the device, $h_{SI}[n]$ indicates a gain of a self-interference channel (self-channel) through which the data transmitted at the RF transmitting end passes. In this case, if k is equal to 1, it corresponds to a linear component. If k is equal to or greater than 3, it corresponds to a nonlinear component. Further, z[n] indicates Additive White Gaussian Noise (AWGN).

When a BS or UE operates in a full-duplex mode for downlink and uplink transmission, if transmit power is changed due to changes in the channel environment and surrounding environment, self-IC performance of the BS and UE may be changed. Specifically, if the transmit power of the BS increases, the self-IC performance of the BS may be changed, and thus the BS may have a problem in receiving uplink data. Moreover, the self-IC performance of the UE may be changed, and thus the UE may also have a problem in receiving downlink data. For example, if the distance between the BS and UE increase due to a movement of the UE, the UE may perform open-loop power control to increase the transmit power. Alternatively, the BS may perform closed-loop power control to increase the transmit power.

In this case, the increased transmit power may increase power of an SI signal at the UE. In particular, as the transmit power increases, even the nonlinear SI signal components, which are not considered in case of low transmit power because power thereof is at the noise floor level, sharply increases. In this case, if only the linear SI components are cancelled by the digital self-IC, a residual SI signal may significantly increase, and the performance of the FDR system may be degraded.

Figure 6:
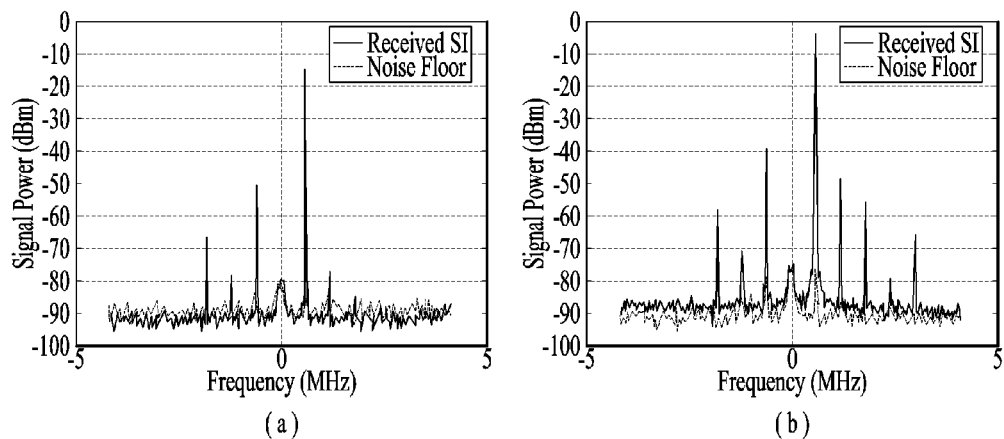
FIG. 6 is a diagram illustrating the strength of a received SI signal depending on transmit power of the apparatus.
Figure 7:
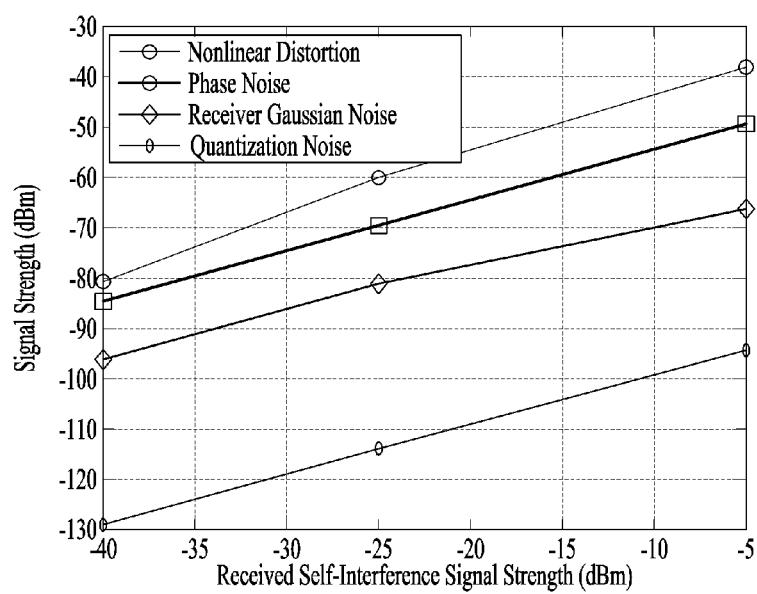
FIG. 7 is a diagram illustrating the strength of a nonlinear distortion signal depending on the strength of received SI power.

In the case of the SI signal including high-order components, the rate of increase in the nonlinear components due to the increase in the transmit power becomes higher than that in the linear components as the order increases. Therefore, the nonlinear SI components should be considered. With reference to FIGS. 6 and 7, the increases in the nonlinear SI components due to the increased transmit power will be described.

FIG. 6 is a diagram illustrating the strength of a received SI signal depending on transmit power of the apparatus.

Specifically, FIG. 6 (*a*) shows the strength of the received SI signal when the transmit power is −10 dBm, and FIG. 6 (*b*) shows the strength of the received SI signal when the transmit power increases to 20 dBm. Comparing FIGS. 6 (*a*) and (*b*), it can be seen that the received SI signal strength of FIG. 6 (*b*), where the transmit power increased to 20 dBm, is higher than that of FIG. 6 (*a*) on the y-axis (expressed as signal power (dBm)). This implies that when the transmit power at the RF end of the apparatus increases, the strength of the received SI signal at the apparatus also increases.

FIG. 7 is a diagram illustrating the strength of a nonlinear distortion signal depending on the strength of received SI power.

Referring to FIG. 7, it can be seen that when the received SI signal strength increases, the strength of the nonlinear distortion signal also increases. That is, when the transmit power of the apparatus increases, the received SI signal strength increases, and thus the strength of the nonlinear distortion signal increases at the receiving end.

On the other hand, when the transmit power decreases, the high-order components, which has been considered, may not be necessarily considered. Thus, the FDR system should perform the digital self-IC by considering high-order terms. Specifically, channel estimation for the high-order terms is required to eliminate the nonlinear SI components. To this end, additional reference signal (RS) assignment is required for SI channel estimation for the nonlinear SI components in consideration of the high-order terms, unlike the RS in the legacy LTE system.

In addition, since characteristics of the nonlinear SI signal are changed depending on not only the transmit power but also an antenna and RF self-IC performance, the high-order terms need to be estimated by considering the transmit power and the antenna and RF self-IC performance. Thus, the RS for estimating the nonlinear SI channel is required. Moreover, if channel estimation accuracy decreases, the performance degradation may occur due to erroneous self-IC. Accordingly, more accurate channel estimation is required.

To this end, it is necessary to implement a channel estimation algorithm based on the RS design considering the nonlinear SI components. Generally, the channel estimation algorithm requires higher RS overhead compared to the existing RS structure. An algorithm for estimating the nonlinear SI channel in a normal multi-channel delay environment may be proposed. In this case, the receiving end can obtain accurate SI channel estimation results using phase modulation based on the same two-symbol structure. However, since one symbol is additionally used unlike the conventional RS, the RS overhead is present.

Figure 8:
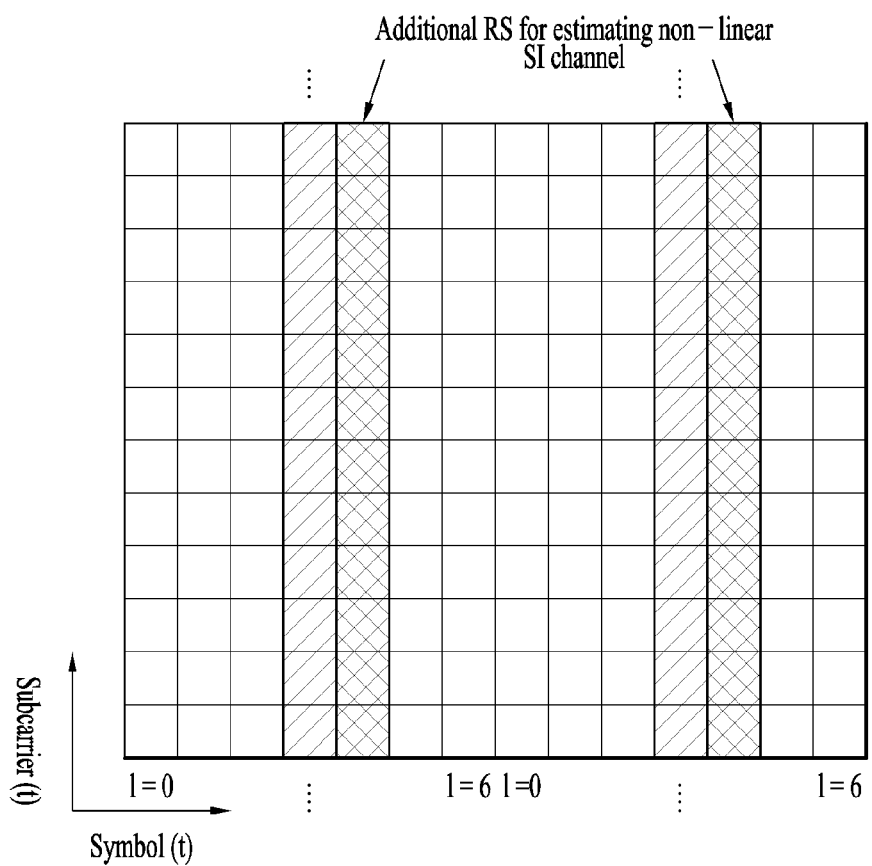
FIG. 8 is a diagram illustrating an example of RS allocation for estimating a nonlinear SI channel.

FIG. 8 is a diagram illustrating an example of RS allocation for estimating a nonlinear SI channel.

For example, as shown in FIG. 8, the RS for estimating the nonlinear SI channel can be configured in an uplink subframe (or frame) of the 3GPP LTE system. In this case, RS mapping according to a nonlinear estimation order may be different from that of FIG. 8.

However, when the additional RS for estimating the nonlinear SI component(s) is assigned due to power adjustment by the BS or UE operating in the FDR mode, the legacy LTE system cannot know the corresponding resource assignment information. In addition, since interference between the legacy system and the FDR system occurs due to the absence of the resource assignment information, pilot contamination may occur with high probability. On the contrary, when the RS allocation for estimating the nonlinear SI components is released in the FUR system due to decreases in the nonlinear SI components, the legacy LTE system cannot obtain resource assignment release information on the corresponding RS resources, and thus resource efficiency is degraded due to the absences of the resource assignment release information. Therefore, to achieve stable FDR operation, signaling for enabling a BS and UE to know how resources are used for the RS for estimating the nonlinear SI components according to the magnitude of the nonlinear SI (signal) components is required.

It is assumed that when channel estimation is performed in an environment with a multi-delay channel length of L, a channel estimation value per order and per delay tap is as follows.

$1^{st}$: $\hat{h}_1[1], \hat{h}_1[2], \ldots, \hat{h}_1[L]$ $3^{rd}$: $\hat{h}_3[1], [1], \hat{h}_3[2], \ldots, \hat{h}_3[L]$, $5^{th}$: $\hat{h}_5[1], \hat{h}_5[2], \ldots, \hat{h}_5[L]$, $7^{th}$: $\hat{h}_7[1], \hat{h}_7[2], \ldots, \hat{h}_7[L]$ Based on the above channel estimation values, power per order can be determined as shown in Equation 2.

$$P_n = \frac{\sum_{k=1}^{L} |\hat{h}_n[k]|^2}{L} \qquad \text{[Equation 2]}$$

Based on Equation 2, a difference between power of the nonlinear SI components and power of linear SI components at the receiving end can be calculated. In addition, the power difference can be calculated in various ways. For example, it can be obtained through subtraction from the received signal based on linear channel estimation.

Self-Interference at the Base Station

For next RS transmission, a BS may allocate additional RS resources for downlink transmission using nonlinearity, that is, a difference between power of a third-order or higher-order components and power of linear component(s)

based on channel estimation for a received RS. Alternatively, the BS may use downlink RS resources previously allocated for estimating the nonlinear components as resources for transmitting data. The BS may signal to a UE the downlink resource allocation information changed according to increases or decreases in the RS resources through a physical layer signal (e.g., physical downlink control channel (PDCCH) or physical downlink shared channel (PDSCH)) or a higher layer signal (e.g., radio resource control (RRC).

In this case, the downlink resource allocation information may include an indicator indicating information on an RS mode. For example, if the indicator is set to '0', the information may indicate that the RS mode corresponds to an existing RS mode for the linear component(s) (i.e., the mode in FIG. 8 where an RS is allocated to the fourth and eleventh symbols in the time domain). If the indicator is set to '1', the information may indicate that the RS mode corresponds to an additional RS mode for estimating the nonlinear component(s) (i.e., the mode where not only is the RS allocated to the fourth and eleventh symbols but also an additional RS is allocated to the fifth and twelfth symbols).

Although FIG. 8 shows that in the case of the existing RS mode, the RS is allocated to the fourth and eleventh symbols and in the case of the additional RS mode, the additional RS is allocated to the fifth and twelfth symbols, this is merely an example. In addition, although FIG. 8 shows the symbols in the existing RS mode and the RS symbols added in the additional RS mode are continuously allocated in the time domain, this is merely an example, and the symbols may not be allocated continuously. However, it is preferable that the symbols are continuously located to improve efficiency of the nonlinear SI channel estimation.

In the following description, P1 indicates the power of the linear SI components at the BS, $\Sigma_k=3,5,7,\ldots P_k$ indicates the power of the nonlinear SI components at the BS, and $\delta$ is a predetermined value. The RS mode change according to increases or decreases in the nonlinear SI components can be determined depending on whether a difference between the power (P1) of the linear SI components and the power ($\Sigma_k=3,5,7,\ldots P_k$) of the nonlinear SI components is higher or lower than the predetermined value $\delta$. In other words, the RS mode can be changed when prescribed conditions are satisfied. The prescribed conditions can be satisfied in the following cases: $P1-\Sigma_k=3,5,7,\ldots P_k<\delta$ and $P1-\Sigma_k=3,5,7,\ldots P_k>\delta$.

In case of $P1-\Sigma_k=3,5,7,\ldots P_k<\delta$ due to the increases in the nonlinear SI components at the BS, the additional RS needs to be allocated for the channel estimation related to the nonlinear components of a residual SI signal. In this case, by signaling to the UE information on the RS mode where the additional RS is allocated for downlink, the BS can not only prevent interference of the RS, which occurs during the channel estimation, but also achieve stable digital self-IC based on improved channel estimation performance.

When the nonlinear SI components at the BS decrease ($P1-\Sigma_k=3,5,7,\ldots P_k<\delta$), the additional RS previously allocated for the channel estimation related to the nonlinear components of a residual SI signal may not be necessary. In this case, the RS allocation may be released, and the released RS resources may be used for other purposes (e.g., enhanced PDCCH (EPDCCH) or PDSCH). In addition, the BS signals to the UE information on the released downlink resources, and thus the UE can use uplink resources which are restricted in use due to existing interference for other purposes (e.g., physical uplink control channel (PUCCH) or physical uplink shared channel (PUSCH)), thereby improving uplink resource efficiency of the UE.

Self-Interference at the User Equipment

In the following description, P1 indicates the power of the linear SI components at the UE, $\Sigma_k=3,5,7,\ldots P_k$ indicates the power of the nonlinear SI components at the UE, and $\delta$ is a predetermined value. The RS mode change according to increases or decreases in the nonlinear SI components can be determined depending on whether a difference between the power (P1) of the linear SI components and the power ($\Sigma_k=3,5,7,\ldots P_k$) of the nonlinear SI components is higher or lower than the predetermined value $\delta$. In other words, the RS mode can be changed when prescribed conditions are satisfied. The prescribed conditions can be satisfied in the following cases: $P1-\Sigma_k=3,5,7,\ldots P_k<\delta$ and $P1-\Sigma_k=3,5,7,\ldots P_k>\delta$.

To estimate the nonlinear components of a residual SI signal, the UE may allocate additional RS resources for uplink transmission using the difference between the power of the nonlinear components (i.e., third-order or higher-order components) and the power of the linear component based on the channel estimation for the received RS. Alternatively, the UE use uplink RS resources previously allocated for estimating the nonlinear components as resources for transmitting data. The UE may signal to the BS the changed uplink resource allocation information through a physical layer signal (e.g., physical uplink control channel (PUCCH) or physical uplink shared channel (PUSCH) or a higher layer signal.

When the nonlinear SI components at the BS increase ($P1-\Sigma_k=3,5,7,\ldots P_k<\delta$), the additional RS needs to be allocated for the channel estimation related to the nonlinear components of the residual SI signal. In this case, by signaling to the BS information on the additionally allocated uplink RS, the UE can not only prevent interference of the RS, which occurs during the channel estimation, but also achieve stable digital self-IC based on improved channel estimation performance.

When the nonlinear SI components at the UE decrease ($P1-\Sigma_k=3,5,7,\ldots P_k>\delta$), the additional RS previously allocated for the channel estimation related to the nonlinear components of the residual SI signal may not be necessary. In this case, the RS allocation may be released, and the released uplink resources may be used for other purposes (e.g., PUCCH or PUSCH). In addition, the UE signals to the BS information on the released uplink resources, and thus the UE can use downlink resources which are restricted in use due to existing interference for other purposes (e.g., PDCCH, ePDCCH, PDSCH, etc.), thereby improving downlink resource efficiency of the BS.

Meanwhile, the BS may transmit the RS resource allocation information changed according to the level of nonlinearity of the SI signal of the BS to a neighboring BS or small-cell BS (small cell eNB) through a higher layer signal or an X2 interface.

In addition, the UE may transmit the RS resource allocation information changed according to the level of non-linearity of the SI signal of the UE to a neighboring UE through a device-to-device (D2D) signal or a higher layer signal.

To implement the above-described methods, the RS resource allocation information depending on the nonlinearity level may be defined in a table in advance for the purpose of reducing signaling overhead, and the BS/UE may transmit a table index or a difference between indices or estimate the index or index difference from other information to inform the RS resource allocation information.

In addition, the aforementioned method can be selectively operated only when the BS or UE operates in the FDR mode.

The BS can operate in the FDR mode in the following cases: when a UE operating in the FDR mode accesses to the BS or when a UE that desires downlink reception and a UE that desires uplink transmission desire to perform communication at the same time. In this case, the method can be selectively operated.

Since in general, the amount of downlink traffic is greater than that of uplink traffic, some of UEs that desire uplink transmission should be able to operate in the FDR mode in order for a certain UE to operate in the FDR mode. In this case, the method can be selectively operated. For example, the BS can expect duration of UE's FDR operation based on a buffer status report (BSR) and trigger UE's control signal transmission so as to receive necessary information from the UE through a physical layer signal or higher layer signal at a desired time.

In addition, regarding the operation performed by the BS and UE in the FDR environment, the BS may inform the UE of information on whether the methods proposed in the present invention are applied or information on rules related to the proposed methods through a predefined signal (e.g., physical layer signal or higher layer signal (e.g., RRC signal)).

The aforementioned embodiments are achieved by combination of structural elements and features of the present invention in a predetermined manner Each of the structural elements or features should be considered selectively unless specified separately. Each of the structural elements or features may be carried out without being combined with other structural elements or features. In addition, some structural elements and/or features may be combined with one another to constitute the embodiments of the present invention. The order of operations described in the embodiments of the present invention may be changed. Some structural elements or features of one embodiment may be included in another embodiment or may be replaced with corresponding structural elements or features of another embodiment. Moreover, it will be apparent that some claims referring to specific claims may be combined with other claims referring to the other claims other than the specific claims to constitute the embodiment or add new claims by means of amendment after the application is filed.

Those skilled in the art will appreciate that the present invention may be carried out in other specific ways than those set forth herein without departing from the essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

The method for changing an RS mode in an environment operating according to a full duplex radio (FDR) scheme and apparatus therefor can be industrially applied to various wireless communication systems including the 3GPP LTE/LTE-A system and the like.

What is claimed is:

1. A method for changing a reference signal (RS) mode by an apparatus operating according to a full duplex radio (FDR) scheme, the method comprising:
when a predetermined condition is satisfied, determining to change from a first RS mode to a second RS mode; and
transmitting information on the determined second RS mode to a user equipment (UE),
wherein the first RS mode and second RS mode are distinguished from each other according to whether RS s added to perform channel estimation for a nonlinear component of a self-interference (SI) signal are transmitted or not.

2. The method of claim 1, wherein the predetermined condition is satisfied when a difference between power of a linear component of the SI signal and power of the nonlinear component of the SI signal is smaller than a predefined value.

3. The method of claim 1, wherein the predetermined condition is satisfied when a difference between power of a linear component of the SI signal and power of the nonlinear component of the SI signal is greater than a predefined value.

4. The method of claim 1, further comprising calculating a difference between power of a linear component of the SI signal and power of the nonlinear component of the SI signal and comparing the difference with a predefined value.

5. The method of claim 2, wherein the second RS mode corresponds to a mode in which the RSs added to perform the channel estimation for the nonlinear component of the SI signal are transmitted.

6. The method of claim 3, wherein the first RS mode corresponds to a mode in which the RSs added to perform the channel estimation for the nonlinear component of the SI signal are not transmitted.

7. The method of claim 5, wherein the information on the determined second RS mode includes resource information for the added RSs.

8. The method of claim 5, wherein the information on the determined second RS mode includes an indicator indicating that resources for the added RSs are assigned.

9. The method of claim 5, wherein the information on the determined second RS mode includes resource information for RSs for which resource assignment is released.

10. The method of claim 5, wherein the information on the determined second RS mode includes an indicator indicating that resource allocation for the added RSs is released.

11. The method of claim 1, further comprising:
transmitting an RS according to the determined second RS mode.

12. An apparatus for changing a reference signal (RS) mode in a full duplex radio (FDR) environment, the apparatus comprising:
a processor configured to determine to change from a first RS mode to a second RS mode when a predetermined condition is satisfied; and
a transmitter configured to transmit information on the determined second RS mode to a user equipment (UE),
wherein the first RS mode and second RS mode are distinguished from each other according to whether RSs added to perform channel estimation for a nonlinear component of a self-interference (SI) signal are transmitted or not.

13. The apparatus of claim 12, wherein the predetermined condition is satisfied when a difference between power of a linear component of the SI signal and power of the nonlinear component of the SI signal is smaller than a predefined value.

14. The apparatus of claim 12, wherein the predetermined condition is satisfied when a difference between power of a linear component of the SI signal and power of the nonlinear component of the SI signal is greater than a predefined value.

15. The apparatus of claim 13, wherein the second RS mode corresponds to a mode in which the RSs added to perform the channel estimation for the nonlinear component of the SI signal are transmitted.

16. The apparatus of claim 14, wherein the first RS mode corresponds to a mode in which the RSs added to perform the channel estimation for the nonlinear component of the SI signal are not transmitted.

17. The apparatus of claim 15, wherein the information on the determined second RS mode includes resource information for the added RSs.

18. The apparatus of claim 15, wherein the information on the determined second RS mode includes an indicator indicating that resources for the added RSs are assigned.

19. The apparatus of claim 15, wherein the information on the determined second RS mode includes resource information for RSs for which resource assignment is released.

20. The apparatus of claim 15, wherein the information on the determined second RS mode includes an indicator indicating that resource assignment for the added RSs is released.

* * * * *